United States Patent [19]
Watanabe

[11] Patent Number: 5,245,511
[45] Date of Patent: Sep. 14, 1993

[54] CAR STEREO HAVING A DETACHABLE GRILLE

[75] Inventor: Masaaki Watanabe, Saitama, Japan

[73] Assignee: Pioneer Electronic Corporation, Tokyo, Japan

[21] Appl. No.: 782,203

[22] Filed: Oct. 24, 1991

[30] Foreign Application Priority Data

Apr. 12, 1991 [JP] Japan ................. 3-33589[U]

[51] Int. Cl.⁵ .......................... H05K 7/12; G12B 9/00
[52] U.S. Cl. ................................... 361/814; 248/27.3; 312/7.1; 361/346; 361/627; 381/86; 455/346
[58] Field of Search ............... 200/50 A, 296; 381/86; 455/345, 346, 347; 334/85; 248/27.1, 27.3, 228, 231.5, 231.9, 311.2; 174/50, 58, 66, 67; 312/7.1, 242; 361/331, 334, 346, 350, 351, 358, 380, 392-395, 419, 417, 422

[56] References Cited
U.S. PATENT DOCUMENTS

| | | | |
|---|---|---|---|
| 3,202,881 | 8/1965 | Carlyle | 361/358 |
| 3,858,091 | 12/1974 | Wilkinson | 361/390 |
| 4,162,517 | 7/1979 | Reed | 361/358 |
| 4,716,496 | 12/1987 | Fritsch | 361/391 |
| 4,868,715 | 9/1989 | Putman | 361/380 |
| 4,969,830 | 11/1990 | Daly | 200/50 A |
| 5,020,748 | 6/1991 | Okajimi | 248/27.1 |
| 5,104,071 | 4/1992 | Kowalski | 248/27.1 |

Primary Examiner—Gerald P. Tolin
Attorney, Agent, or Firm—Nikaido, Marmelstein, Murray & Oram

[57] ABSTRACT

A car stereo has a grille detachably mounted on a stereo body. Engaging recesses are formed at the four corners of the grille. Flexible latch members are provided on the stereo body, each of which is adapted to engage with the corresponding engaging recess of the grille when the grille is attached to the body. A release mechanism is provided on the body, which is operated by a release member provided on the grille. When the release mechanism is operated, the engagement between the engaging recesses and the latch members is released.

3 Claims, 7 Drawing Sheets

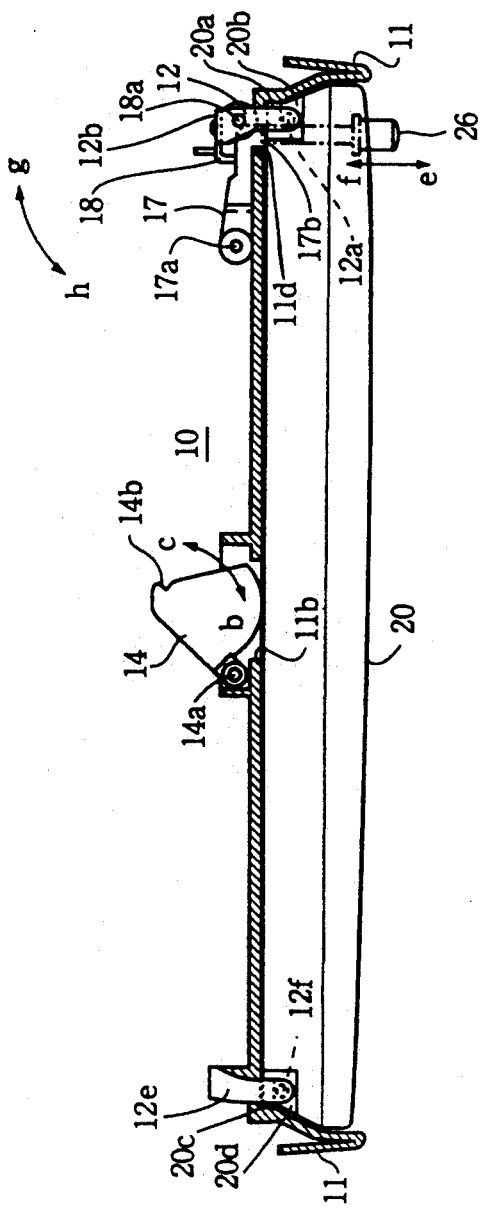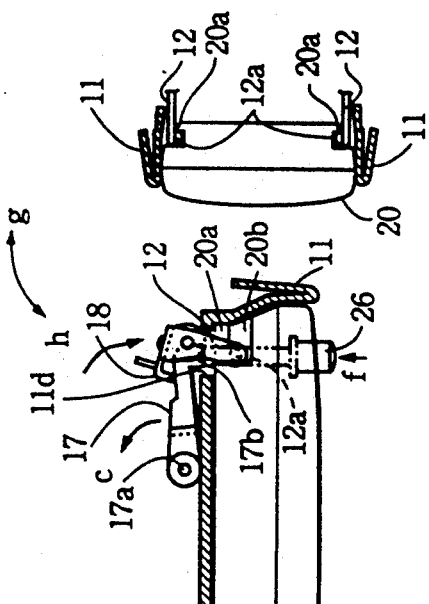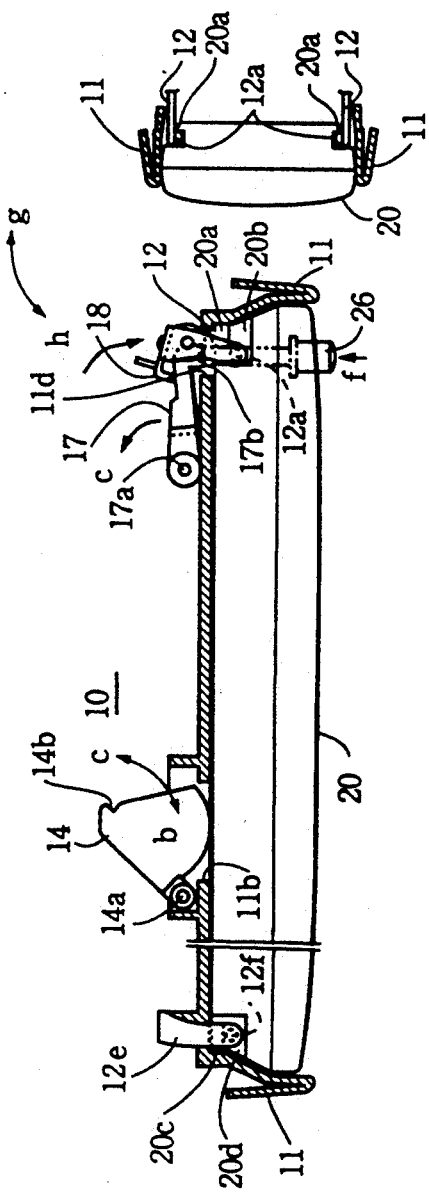

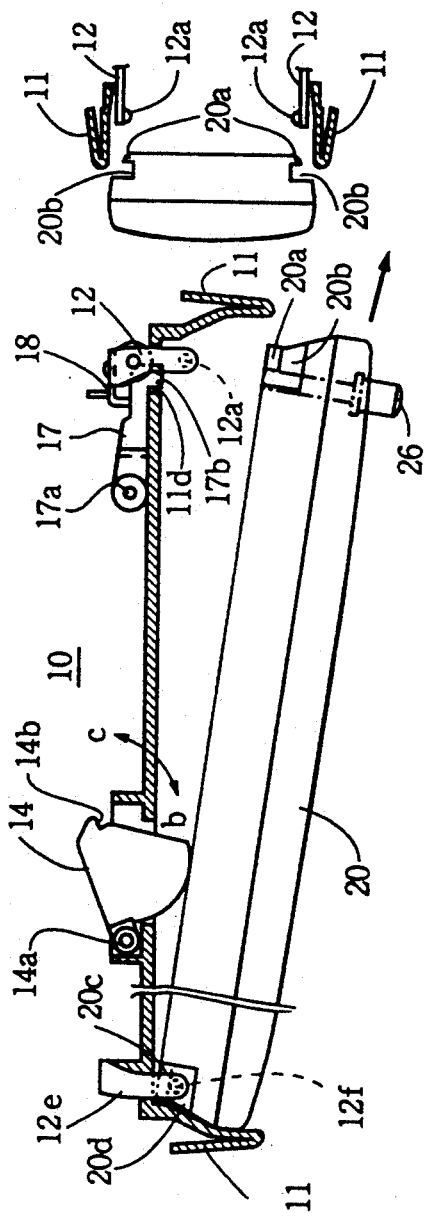

CAR STEREO HAVING A DETACHABLE GRILLE

FIELD OF THE INVENTION

The present invention relates to a car stereo provided with a detachable grille, and more particularly to a device for attaching and detaching the grille.

BACKGROUND OF THE INVENTION

Increase in use of sophisticated car stereoes in recent years has caused increase in the theft of the stereoes. In order to prevent the theft of the stereoes, there has been proposed measures for the stereoes. In accordance with one of the measures, a grille having a plurality of push buttons for the stereo is provided to be separated from the body of the stereo, and is detachably attached to the front portion of the stereo.

FIGS. 8 to 10 show the above described prior art. The car stereo comprises a car stereo body 1 and a detachable grille 3 attached to the body 1. The body 1 has recessed panel 5 mounted at the front thereof. The grille 3 has various push buttons 2.

Referring to FIG. 9, in order to attach the grille 3 on the body 1, a groove 4 formed in one side of the grille 3 is engaged with a projection 6 projecting into the recess of the panel 5 from an inner edge thereof, thereby positioning the grille 3. The grille 3 is then pivoted about the projection 6 so as to close in on the panel 5, so that a hook 7a formed on an end of an engaging member 7 of a push-push mechanism (not shown) provided in the body 1 engages with a recess 8 formed at the inner corner of the other end of the grille 3. The engaging member 7 is retracted as the grille 3 is pivoted. Thus the grille 3 fits in the recess of the panel 5, where the member 7 is locked by the push-push mechanism. If the grille 3 is forcibly depressed, the lock mechanism is released, so that the grille can be removed from the body.

In order to detach the grille 3 from the panel 5, the grille 3 at the side having the inner recess 8 is depressed. The push-push mechanism in accordingly operated to project the engaging member 7 as shown in FIG. 10. The grille 3 is pivoted about the projection 6 and pulled off the panel 5 of the body 1.

When the grille 3 is taken out, the stereo body loses the appearance of a car stereo. Hence, if the grille 3 is removed when the driver leaves vehicle, the theft of the car stereo is prevented.

However, in order to attach the grille 3 to the car stereo body 1, two manual operations must be carried out. Namely the groove 4 of the grille 3 is engaged with the projection 6 formed on the panel 5 and then the grille 3 must be forcibly depressed into the recess of the panel 5. Furthermore, when detaching the grille 3, the engaging member 7 of the push-push mechanism projects out from the body 1 by a predetermined length, so that a pivoting angle of the grille 3 is determined by the length and cannot be changed.

SUMMARY OF THE INVENTION

An object of the present invention is to provide a car stereo where a grille can be easily attached to and detached from a car stereo body.

To this end, the car stereo according to the present invention has a detachable grille having engaging portions at the four corners thereof, and has a car stereo body having flexible latch members each of which adapted to engage with the corresponding engaging portion of the grille when the grille is attached to the body. A release mechanism is operated by a release member provided on the grille, to release the engagement between the engaging portion and the latch member thereby to detach the grille. A push member is provided in the car stereo body for pushing the grille outward when detaching the grille.

In an aspect of the invention, the push member is laterally slidably mounted in the car stereo body.

In accordance with the present invention, each flexible latch member provided on the car stereo body engages with the engaging portion of the grille when attaching the grille to the car stereo body. The release member of the grille is operated to actuate the release mechanism, thereby disengaging the flexible latch member from the engaging portion. At the same time, the push member pushes the back of the grille to rotate it outward so that the grille can be removed.

The grille is thus easily attached to the body by inserting the grille in the recess formed on the body and easily detached by operating the release member.

When the position of the push member is changed in the lateral direction of the car body, the distance between the pivot about which the grille swings and the push member is changed. Thus the pivoting angle of the grille can be changed.

The other objects and features of this invention will become understood from the following description with reference to the accompanying drawings.

BRIEF DESCRIPTION OF DRAWINGS

FIG. 2 is a sectional view of a part of the car stereo with the grille attached;

FIGS. 3a, 3b, 4a and 4b are sectional views of a part of the car stereo describing the attaching and detaching operations of the grille;

DETAILED DESCRIPTION OF THE PREFERRED EMBODIMENTS

Figure 1:
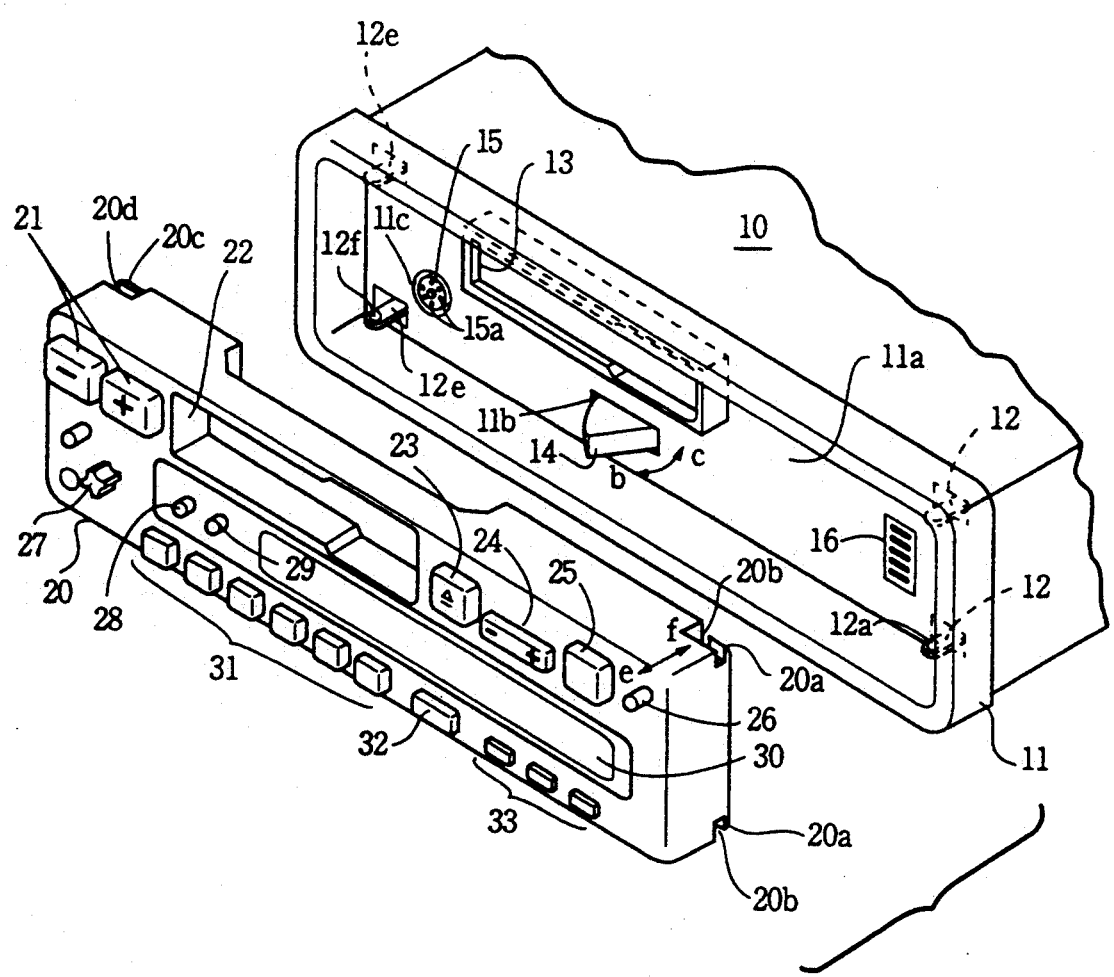
FIG. 1 is a perspective view of a car stereo having a detachable grille to which the present invention is applied, with the grille shown in a detached state.

Referring to FIG. 1, a car stereo as one of electric equipment to which the present invention is applied comprises a car stereo body 10 and a grille 20.

On the face of the grille 20 are provided various push buttons and knobs for operating the car stereo. Namely, in the upper row from the left to the right, provided are a pair of volume control buttons 21, cassette opening 22, ejection button 23, mode select button 24 and source select button 25. In the second row, also from the left are a fader knob 27, loudness button 28, time adjusting button 29 and a liquid crystal display 30. In the bottom row, six preset buttons 31, frequency select button 32 and function buttons 33 for selecting the operational functions of the car stereo are provided under the buttons 28, 29 and the display 30 from the left.

A release button 26 urged in a direction e in the figure by a spring (not shown) is provided at an upper right hand corner of the grille 20 for releasing the grille 20 from the body 10. Each of the rear upper and lower right hand corners of the grille 20 is partly cut way to form an engaging recess 20b and an engaging projection 20a having a slant at the back thereof. An engaging recess 20d and engaging projection 20c similar to the recess 20b and projection 20a respectively, are formed at each of the upper and lower rear corners of the left side of the grille 20.

A front panel 11 having a recess 11a is fixed on the outer periphery of the front portion of the car stereo body 10. The recess 11a is so dimensioned that the grille 20 snugly fits therein. At an upper central portion of the panel 11 is formed a cassette opening 13 which coincides with the cassette opening 22 of the grille 20.

An opening 11b through which a push member 14 provided in the body 10 protrudes is formed under the cassette opening 13. A shown in FIG. 2, the push member 14 is pivotally mounted on a shaft 14a attached to the back of the panel 11. The push member 14 is urged by a spring (not shown) in a direction b until a lobe 14b thereof engages the periphery of the opening 11b. When the grille 20 is inserted in the recess 11a, the member 14 is pushed in a direction c into the body 10 against the elastic force of the spring as shown in FIG. 2.

Explaining a releasing mechanism for the grille 20, a releasing arm 17 is pivotally mounted on a shaft 17a adjacent the upper right hand corner of the panel 11 inside the car stereo body 10. The releasing arm 17 urged by a spring (not shown) in the direction b, that is in the same direction as the push member 14, abuts against the panel 11. An abutting end 17b of the arm 17 adapted to confront the release button 26 provided on the grille 20 is partly inserted in a hole 11d formed in the panel 11.

At each of the upper and lower corners, a lever 18 is mounted on a shaft 18a to be pivoted in directions g and h. The lever 18 is urged by a spring (not shown) in the direction h, thereby abutting one side thereof against the arm 17. To an end of the lever 18 is attached a flexible latch member 12 which projects out of a hole formed in the panel 11. The latch member 12 has a projection 12a which engages in the engaging recess 20b of the grille 20 at a position inside the projection 20a.

A flexible latch member 12e having a downward or upward projection 12f is mounted on the body 10 facing each of the projection 20c and recesses 20d of the grille 20 at the other corners thereof as shown in FIG. 2, to hold the grille 20. The shafts 18a of the upper and lower levers 18 are connected with each other, so that both levers 18 are rotated together.

A series of terminals 16 connected to terminals (not shown) provided on the back of the grille 20 is disposed at the right-hand side of the panel 11. To the left of the cassette opening 13 corresponding to the position of the fader knob 27 is formed a shaft opening 11c. A connector 15 having a plurality of projections 15a, for connecting the fader knob 27 to a fader controller (not shown) as a manually operated electronic device is disposed in the body 10 directly behind the panel 11 facing the opening 11c.

The operation for attaching the grille 20 to the car stereo body 10 is described hereinafter. The grille 20 is held in parallel with the panel 11 and inserted in the recess 11a. The projections 12a and 12f of the latch members 12 and 12e abut against inclined backs of the projections 20a and 20c of the grille 20. As the grille 20 is further pushed in the panel 11, each of the latch members 12, 12e deflects as the projections 12a, 12f thereof tries to slide over the projections 20a and 20c. Thereafter, the projections 12a, 12f overcome the projections 20a and 20c and fit in the recesses 20b and 20d as shown in FIG. 3b, thereby securely holding the grille 20 in the recess 11a. The push member 14, pushed by the back wall of the grille 20, pivots about the shaft 14a in the direction c against the urging of the spring so as to be disposed inside the car stereo body 10 as shown in FIG. 3a.

In order to detach the grille 20 from the car stereo body 10, the release button 26 on the grille is depressed in a direction f as shown in FIG. 3a. The inner end of the button 26 abuts on the abutting end 17b of the arm 17, thereby rotating the arm in the direction c. The rotation of the arm 17 causes the upper and lower levers 18 to pivot together with the shafts 18a in the direction g. As a result, each latch member 12 connected to the lever 18 is horizontally rotated also in the direction g, thereby releasing the projection 12a from the recess 20b and the projection 20a.

Referring to FIG. 4a, as the grille 20 is slightly detached from the panel 11, the push member 14 is rotated in the direction b by the urging of a spring to protrude out of the opening 11b, thereby pushing the grille 20. Since the left hand corners of the grille 20 are still attached to the panel 11, the grille 20 is pivotally pushed by the push member 14 about the left rear side edge thereof until the lobe 14b of the push member 14 abuts against the panel 11. The grille 20 is then pulled to the right as shown by an arrow in FIG. 4a, thereby releasing the engagement between the projections 12f and the projections 20c. Thus the grille is removed from the body 10.

The grille 20 is attached to the car stereo body 10 by depressing the grille 20 into the recess 11a of the body until the projections 12a and 12f of the respective latch members 12 and 12e engage the corresponding projections 20a and 20c of the grille 20. When the release button 26 on the grille 20 is depressed to detach the grille 20, the release mechanism provided in the car stereo body 10 is operated, thereby releasing the engagement between the projections 12a and the projections 20a at the upper and lower right hand corners of the grille 20. As the grille 20 pivots about the rear left side edge, the push member 14 projects out of the body 10 to push the back of the grille 20. Thus the grille 20 is easily attached to and detached from the body.

Modifications of the push member 14 provided in the car stereo to which the present invention is applied are described hereinafter with reference to FIGS. 5 to 7. The same reference numerals as those in FIG. 1 designate the same parts in each figure.

Figure 5:
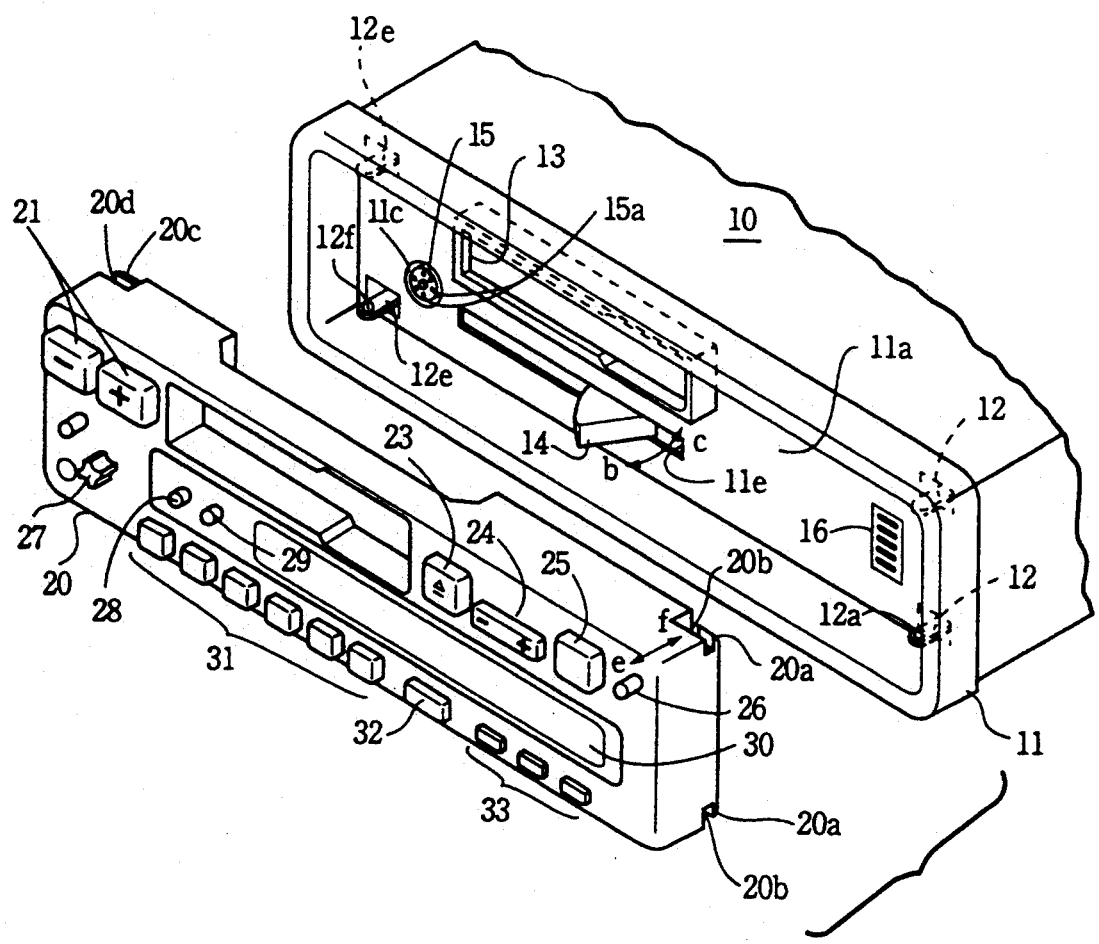
FIGS. 5 to 7 are perspective views showing modifications of the car stereo to which the present invention is applied.

Referring to FIG. 5, the panel 11 attached to the car stereo body 10 has a laterally elongated opening 11e in which the push member 14 urged by a spring in the direction b slides. By sliding the push member 14 in the opening 11e, the distance between the member 14 and the pivot, namely rear left side edge of the grille 20 about which the grille 20 pivots when detaching the grille, can be changed. As the push member 14 approaches the pivot, the grille 20 rotates a larger angle. Accordingly, in the modification, the pivoting angle of the grille by the push member 14 can be controlled.

Figure 6:
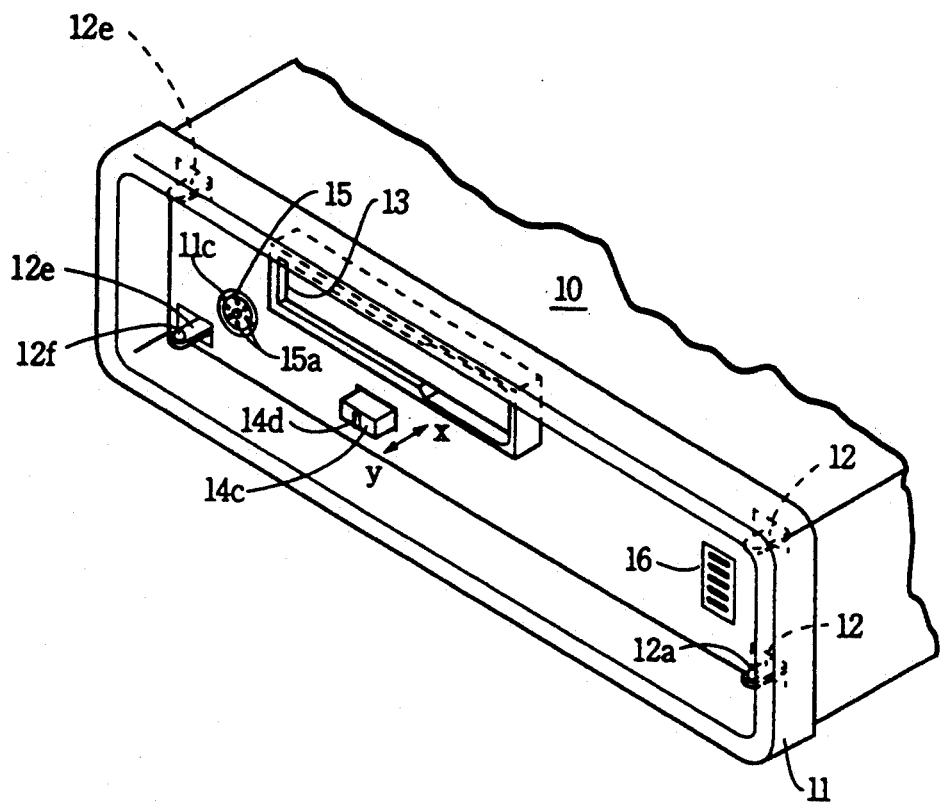

A push member 14c of the modification shown in FIG. 6 is urged by a spring in a direction y, thereby shifting in directions x and y. A roller 14d which abuts on the grille 20 is provided on the front side of the push member 14c. When releasing the grille 20, the roller 14d decreases the sliding friction between the push member 14c and the grille 20, thereby smoothly rotating the grille 20.

Figure 7:
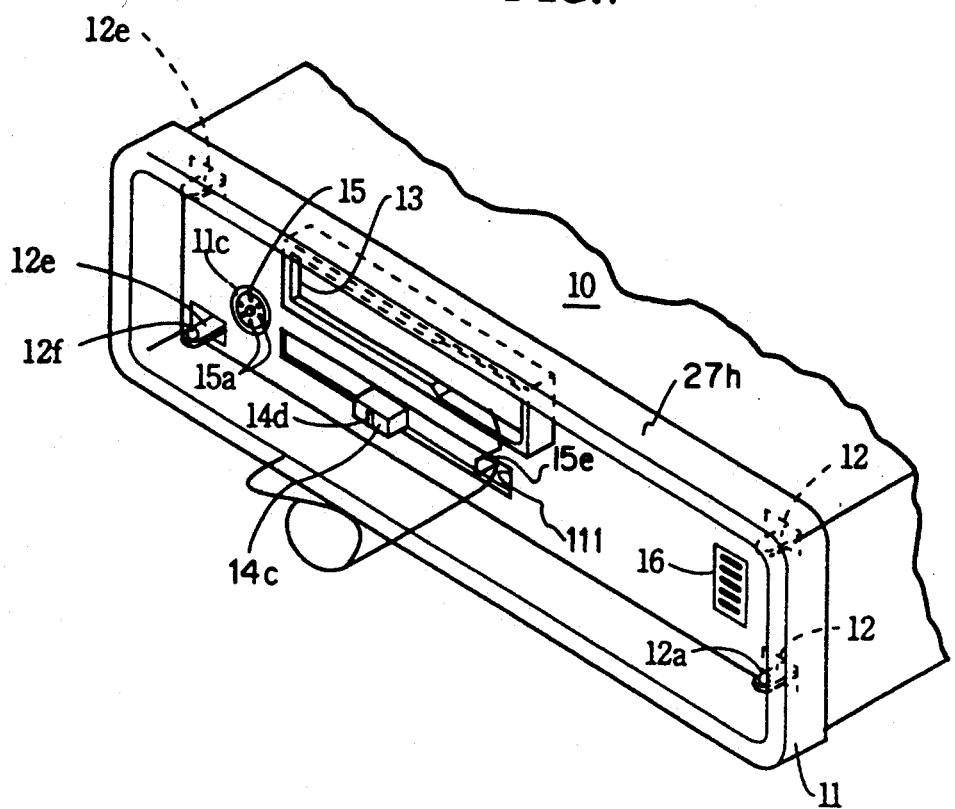
Figure 8:
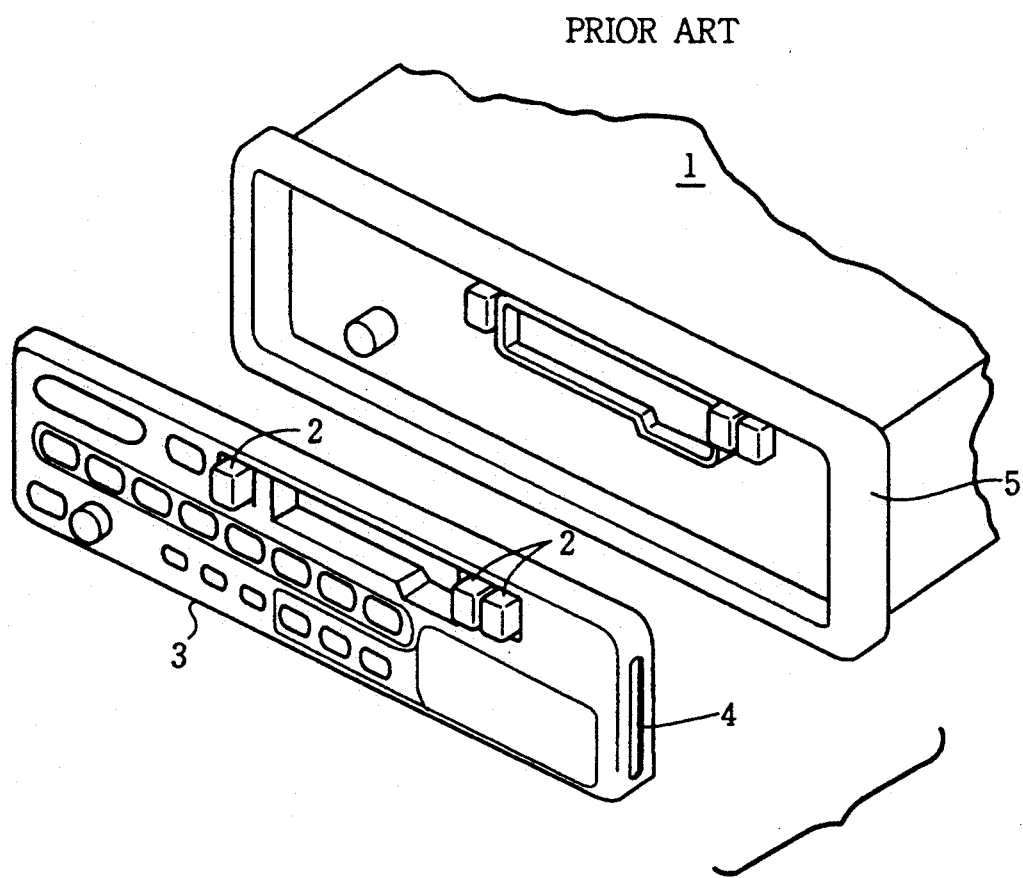
FIG. 8 is a perspective view of a conventional car stereo having a grille, shown in a detached state.
Figure 9:
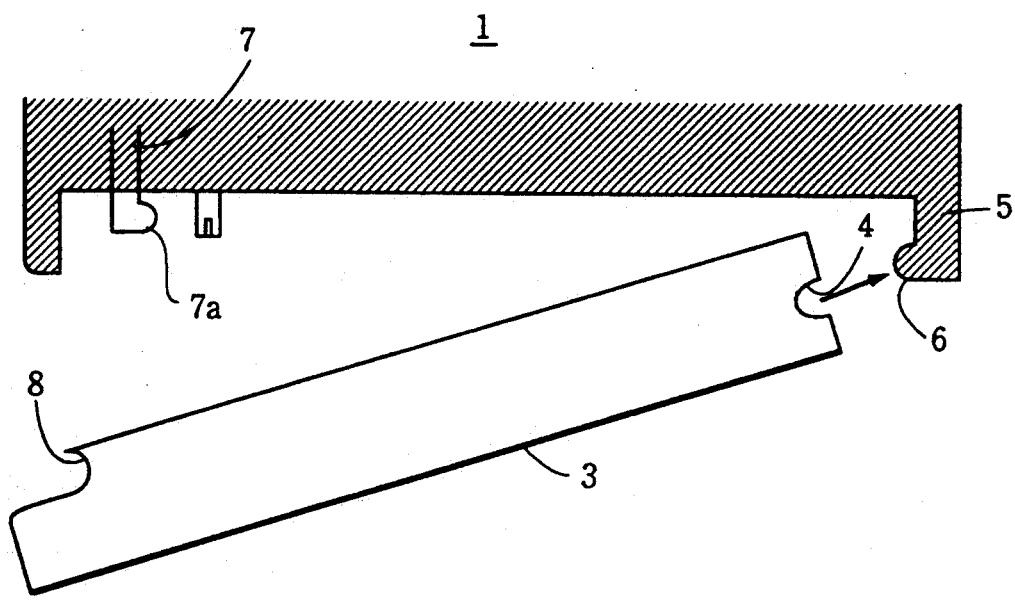
FIGS. 9 and 10 are schematic sectional views of the conventional car stereo describing the attaching and detaching operations of the grille.
Figure 10:
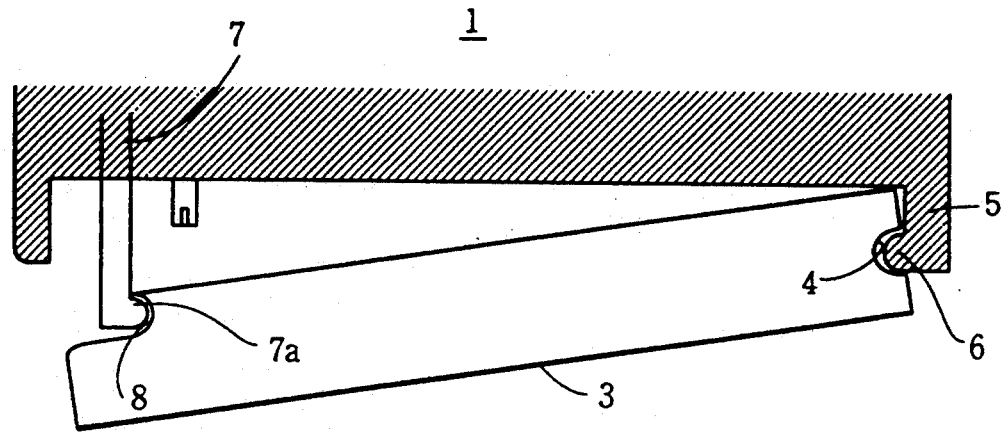

In the modification shown in FIG. 7, the push member 14c having the roller 14d slides in an elongated opening 11f formed in the panel 11. Thus the pivoting angle of the grille 20 can be controlled in the same manner as in the modification shown in FIG. 5. Since the member 14 has the roller 14d for decreasing the sliding friction, a larger pivoting angle can be provided.

From the foregoing, it will be understood that the present invention provides a car stereo having a detachable grille wherein the grille is attached and detached with ease. A push member for pushing the grille outward when removing it may be capable of sliding in a lateral direction, so that the distance between the push member and the pivot of the rotating grille is changed. Accordingly, the pivoting angle of the grille can be adjusted.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A car stereo having a car stereo body and a detachable grille comprising:

engaging portions formed on the grille;

flexible latch means provided on the car stereo body each of which removably engages with the corresponding engaging portion of the grille;

a release mechanism to release the engagement between the engaging portions and the flexible latch means;

a manually operated release member provided on the grille for operating the release mechanism to release the flexible latch means from the engaging portions; and a push member, provided in the stereo body, which pushes out on the grille, wherein said release mechanism releases at least one of said flexible latch means provided on a release side of said car stereo and wherein the flexible latch means provided on another side of the car stereo is provided to hole the grille to prevent the grille from falling when said at least one flexible latch means on the release side is released.

2. A car stereo according to claim 1 wherein each of the engaging portions is an engaging recess formed in the grille.

3. A car stereo according to claim 1 wherein the push member is slidably provided in a lateral direction of the car stereo.

* * * * *